(12) United States Patent
Hirth et al.

(10) Patent No.: US 8,317,223 B2
(45) Date of Patent: Nov. 27, 2012

(54) RESTRAINT SYSTEM FOR A MOTOR VEHICLE

(75) Inventors: Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 341 days.

(21) Appl. No.: 12/377,529

(22) PCT Filed: Jun. 23, 2007

(86) PCT No.: PCT/EP2007/005557
§ 371 (c)(1),
(2), (4) Date: Jun. 22, 2010

(87) PCT Pub. No.: WO2008/019725
PCT Pub. Date: Feb. 21, 2008

(65) Prior Publication Data
US 2010/0259034 A1   Oct. 14, 2010

(30) Foreign Application Priority Data
Aug. 14, 2006  (DE) .......................... 10 2006 038 124

(51) Int. Cl.
*B60R 21/231* (2011.01)
*B60R 21/233* (2006.01)
(52) U.S. Cl. ...................................... 280/743.1; 280/729
(58) Field of Classification Search .................. 280/736, 280/738, 743.1, 729, 733
See application file for complete search history.

(56) References Cited

U.S. PATENT DOCUMENTS

| | | | | |
|---|---|---|---|---|
| 3,784,225 A | * | 1/1974 | Fleck et al. | 280/729 |
| 3,788,663 A | * | 1/1974 | Weman | 280/729 |
| 3,843,150 A | | 10/1974 | Harada et al. | |
| 3,883,154 A | * | 5/1975 | McCullough et al. | 280/735 |
| 3,887,213 A | * | 6/1975 | Goetz | 280/738 |
| 3,907,327 A | | 9/1975 | Pech | |
| 3,929,350 A | * | 12/1975 | Pech | 280/729 |
| 4,076,277 A | | 2/1978 | Kuwakado et al. | |
| 4,500,114 A | * | 2/1985 | Grey, Jr. | 280/742 |
| 4,875,548 A | * | 10/1989 | Lorsbach | 182/137 |
| 5,372,381 A | * | 12/1994 | Herridge | 280/743.1 |
| 5,542,695 A | | 8/1996 | Hanson | |
| 6,059,312 A | | 5/2000 | Staub et al. | |

(Continued)

FOREIGN PATENT DOCUMENTS
DE 2158341 5/1972
(Continued)

OTHER PUBLICATIONS

English language translation of Chinese Office Action dated Sep. 20, 2010 (Five (5) pages).

(Continued)

*Primary Examiner* — Eric Culbreth
*Assistant Examiner* — Barry Gooden, Jr.
(74) *Attorney, Agent, or Firm* — Crowell & Moring LLP

(57) ABSTRACT

A restraint system for a motor vehicle is formed by one or more inflatable supporting structures whose longitudinal extent in the deployed state substantially exceeds their transverse dimension, and which unfold mainly in the direction of their longitudinal extension. During unfolding, the supporting structure, when impacting upon an obstacle does not have the same stability as when it is completely unfolded, and/or does not reach the final volume or the final extension.

16 Claims, 5 Drawing Sheets

U.S. PATENT DOCUMENTS

| | | | |
|---|---|---|---|
| 6,131,942 A | 10/2000 | Fujii et al. | |
| 6,199,903 B1 | 3/2001 | Brambilla et al. | |
| 6,260,877 B1 * | 7/2001 | Rasmussen, Sr. | 280/729 |
| 6,419,267 B1 | 7/2002 | Hashimoto et al. | |
| 6,702,320 B1 * | 3/2004 | Lang et al. | 280/729 |
| 7,188,862 B2 * | 3/2007 | Webber | 280/729 |
| 7,396,043 B2 * | 7/2008 | Choi et al. | 280/743.1 |
| 7,448,644 B2 * | 11/2008 | Zhong et al. | 280/729 |
| 7,503,583 B2 * | 3/2009 | Muller | 280/743.1 |
| 2004/0051286 A1 | 3/2004 | Fischer et al. | |

FOREIGN PATENT DOCUMENTS

| | | |
|---|---|---|
| DE | 2 302 737 | 8/1973 |
| DE | 198 47 854 C2 | 4/2000 |
| DE | 101 34 732 A1 | 2/2003 |
| DE | 699 11 325 T2 | 4/2004 |
| EP | 0 589 059 B1 | 3/1994 |
| EP | 0 950 582 B1 | 10/1999 |
| EP | 1 477 372 A1 | 11/2004 |
| GB | 1 420 226 | 1/1976 |
| JP | 3-41005 A | 2/1991 |
| JP | 3-49048 A | 3/1991 |
| JP | 5-78946 A | 3/1993 |
| JP | 2000-289560 A | 10/2000 |
| WO | WO 99/65737 A2 | 12/1999 |

OTHER PUBLICATIONS

English language translation of Chinese Office Action dated Jul. 6, 2011 (Three (3) pages).
International Search Report dated Oct. 16, 2007 with a partial English translation (Seven (7) pages).
German Search Report dated Nov. 10, 2006 with an English translation (Nine (9) pages).
Form PCT/ISA/220 and Form PCT/ISA/237 dated Oct. 16, 2007 with an English translation of the pertinent portions (Ten (10) pages).
Japanese Office Action dated May 25, 2011 (three (3) pages).

* cited by examiner

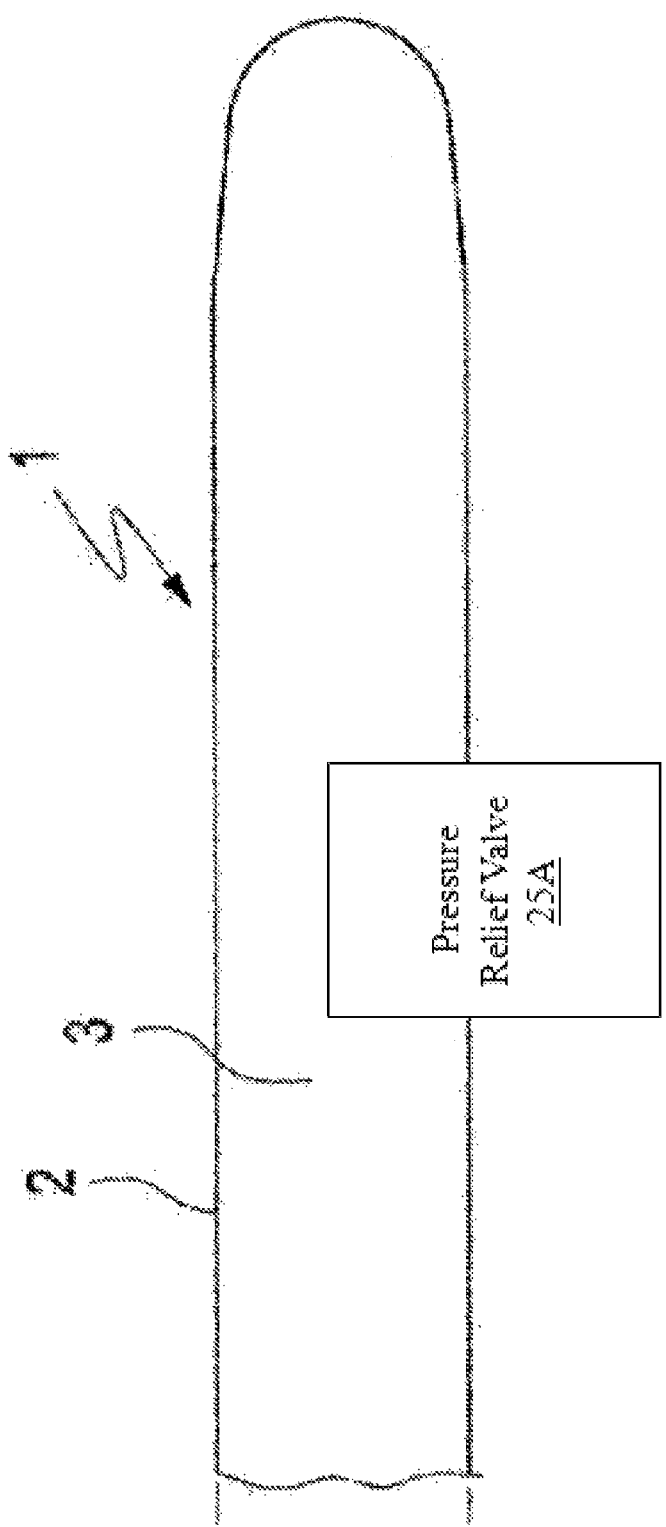

RESTRAINT SYSTEM FOR A MOTOR VEHICLE

CROSS REFERENCE TO RELATED APPLICATIONS

This application is related to co-pending U.S. patent application Ser. No. 12/377,573, filed on the same date.

BACKGROUND AND SUMMARY OF THE INVENTION

This application is a National Stage of International Application No. PCT/EP2007/005557, filed Jun. 23, 2007, which claims priority under 35 U.S.C. §119 to German Patent Application No. 10 2006 038 124.6, filed Aug. 14, 2006, the entire disclosure of which is herein expressly incorporated by reference.

The present invention relates to a restraint system for a motor vehicle.

It is well known for motor vehicles to protect occupants from injuries by inflating an air bag in a short period of time, to catch the occupant who is displaced in a forward direction. For this purpose, it is important that the air bag quickly reaches its effective volume, and it is therefore necessary to produce relative large amounts of gas (e.g., in a pyrotechnical manner) and to introduce them into the gas bag. Recently, for dimensioning the gas volume to be added, occupant/and or vehicle parameters have been evaluated, so as not to unfold the gas bag to its full size for example in the case of a so-called "out of position" of the occupant. However, the necessity for adjustment to all possible load conditions and the relatively cost-intensive control and regulation technique have made this feature problematic.

Intensified efforts have been made, therefore to develop so-called self-regulating systems which can adjust automatically to the corresponding load conditions. For example, venting apertures have been provided, which close automatically when the inner pressure of the gas bag becomes too large.

German patent document DE 2 302 737 discloses a restraint system comprising a two-layer gas bag, where the gas is guided only between the two layers, so that a complete gas cushion does not result; rather, a spherical annular supporting structure. The unfolding of the support structure thereby occurs in the transverse direction of the abutting gas cushions. On the other hand, European patent document EP 0589 059 B1 shows furthermore, that it is necessary during the unfolding of the two-layer gas bag, to suck ambient air into the interior so as to overcome the negative pressure.

Both of these systems have in common the feature that less gas volume is necessary to unfold the gas bag to its full size, due to the gas bag's being formed with two layers. The temperature and the pollution can thereby be reduced.

Finally, UK patent document GB 1 420 226 A discloses a restraint system for a motor vehicle, where a tubular supporting structure is provided in the interior of the two-layer gas cushion, the longitudinal extension of which exceeds the dimensions of the transverse extension in the inflated (that is, active) state. The supporting structure unfolds due to its particular geometry mainly in the direction of its longitudinal extension.

An automatic adjustment of the gas bag dependent on the respective load condition (e.g., dependent on the respective occupant or his or her position) is not described.

It is therefore an object of the present invention to improve the generic restraint system in such a manner that its size adjusts to the respective load condition.

This and other objects and advantages are achieved by the restraint system according to the invention, which when it impacts upon an obstacle during unfolding, does not achieve the stability it would have when fully unfolded and/or the final volume or the final extension, due to the particular geometric form of the supporting structure (that is, due to its longitudinal extension exceeding its cross section). The supporting structure has a different stability during unfolding, due to its longitudinal formation. While the supporting structure is initially rather unstable (that is, can be easily hindered during unfolding), the completely unfolded supporting structure achieves full stability (that is restraining force). This means that, if the supporting structure impacts upon an obstacle during the unfolding, as is the case for example with occupants leaning forward (out of position), unfolding can be stopped more easily or deflected due to the supporting structure which is still unstable. These small forces effect a low pressurization of the occupant.

As used herein, the term "supporting structure" refers to a structure which is similar to a skeleton (in contrast to a conventional spherical gas bubble—a gas bag), and which comprises a restraint effect in the fully unfolded state comparable to the conventional gas bag. The provision of a substantially more complex inflatable supporting structure according to the invention, for example a branched tree structure not only reduces the necessary gas volume, but also diminishes the force peaks acting on the occupant during unfolding, if he is effectively "in the way" of the unfolding supporting structure. In contrast, the gas amount in the conventional gas bubble is on a substantially higher level from the start of the activation until the full unfolding, so that obstacles in the unfolding path are put under more pressure independent of the unfolding state.

The supporting structure can preferably be filled with gas, and it is unimportant whether it is filled with gas generated in a pyrotechnical manner or with gas from a pressure vessel or the ambient air. The ambient air can be guided into the carrier volume enclosed by the supporting structure by suction through the negative pressure occurring during the unfolding. The gas volume can be reduced further in this manner.

If several supporting structures are provided, which are connected to one another or to the environment in a fluidic manner, a restraint system can be formed, which is constructed in a net-like, tree-like or supporting frame-like manner. Thus, supporting structures proceeding in the longitudinal direction of the vehicle can be connected to supporting structures proceeding transversely to the transverse direction of the vehicle. The unfolding of the transverse supporting structures thereby nevertheless takes place in the direction of the longitudinal extension of the respective supporting structure.

The supporting structures can be connected by flexible sheets, in particular flexible textile sheets. In this case, the flexible sheet can be fixed between two adjacent supporting structures.

If several supporting structures are connected to one another by a flexible sheet, the gas can be used for restraining action in the resulting enclosed carrier volume enclosed. The gas in the carrier volume serving to restrain occupants can be heated or supplemented by means of a heating device (e.g., an ignition tablet or a small gas generator step, which develops heat with a possibly very low gas volume). As a result, the gas volume or the inner pressure, and thus the restraint action, increases therewith correspondingly.

If a supporting structure impacts upon an obstacle during unfolding, the gas flowing into the supporting structure can be distributed to other adjacent supporting structures or into the environment, by gas redistribution components. The inner pressure generated by the flow in the supporting structure can also be reduced by increasing its cross section. This can take place in such a manner that tear seams break down at a certain pressure, so that the supporting structure can increase in its transverse direction. A pressure-relief valve can also be provided, which opens when an interior pressure is reached which is too high.

With conventional compact gas bags, it was previously necessary to refrain from directing venting apertures towards the occupant, because gas temperatures are reached which are too high. However, with the system according to the invention, as cold ambient air flows within the carrier volume, and not a pyrotechnically produced gas, and venting apertures can be directed towards the occupant by the reduced temperature. The air bag dampening can thus be adapted for various environmental conditions, by sealing a venting aperture cross section between occupant and air bag.

Thus, this contact surface and its sealing with persons having a higher volume (and usually a higher weight) is larger, so that a stronger restraint action is achieved hereby. With more severe accidents, the contact surface and thus the restraint action is also increased by a stronger immersion of the occupant into the air bag. This principle also permits a variable air bag dampening for belted and unbelted occupants, because in the unbelted state, the occupant will be immersed into the air bag with less force.

If the venting apertures are formed as perforations (that is, many small apertures), as for example with a textile net, a projection area corresponding to the measurements of the occupant can be closed. The reproducibility of the results increases on average with many small venting apertures.

In a preferred embodiment, at least one of the supporting structures extends at least partially in an overlap of a hard structure, as for example a supporting column. It is also possible to provide a structure which unfolds between the occupants as an interaction bag.

So as to be able to manufacture a complex supporting structure with its inflatable components and the flexible sheets, the one-piece woven technique is recommended. This technique distinguishes itself in that, on one and the same device, a double layer can be manufactured for the inflatable structures, and one layer for the flexible sheets, or a three-dimensional structure can be woven.

Other objects, advantages and novel features of the present invention will become apparent from the following detailed description of the invention when considered in conjunction with the accompanying drawings.

BRIEF DESCRIPTION OF THE DRAWINGS

FIGS. 7A and 7B are illustrations of the supporting structure according to FIG. 1 in the fully unfolded condition with a pressure-relief valve.

DETAILED DESCRIPTION OF THE DRAWINGS

Figure 1:
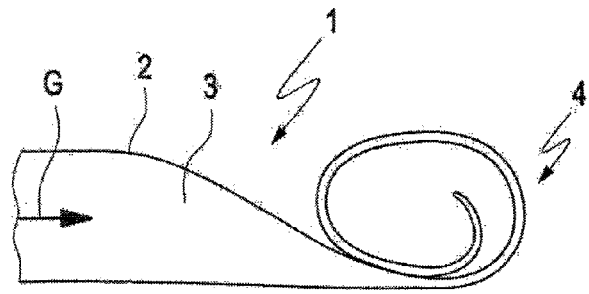
FIG. 1 shows a supporting structure shortly after activation of a gas generator.
Figure 2A:
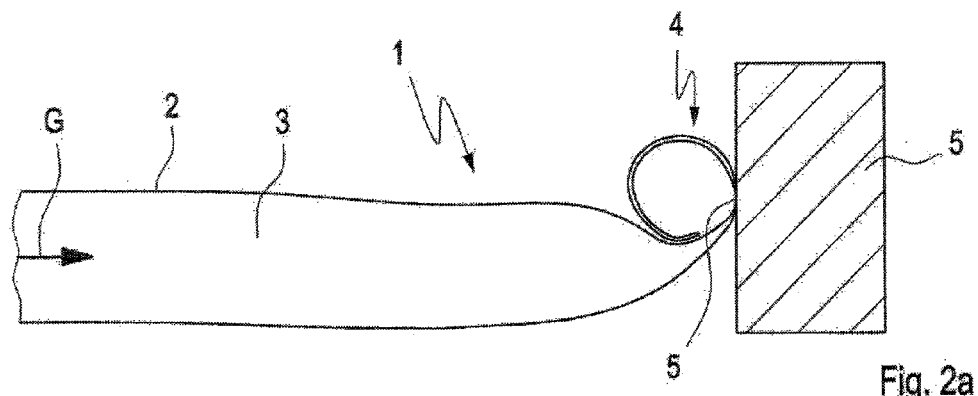
FIG. 2a shows an obstruction of the unfolding of the supporting structure according to FIG. 1 when impacting upon an obstacle.
Figure 2B:
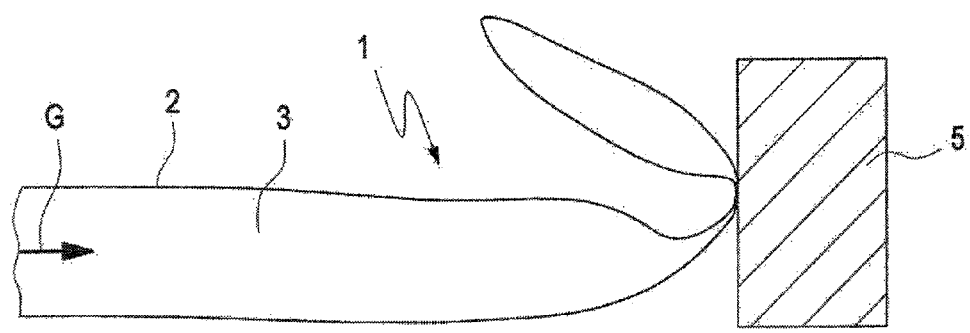
FIG. 2b illustrates evasion of the supporting structure according to FIG. 1 when impacting upon an obstacle.
Figure 3:
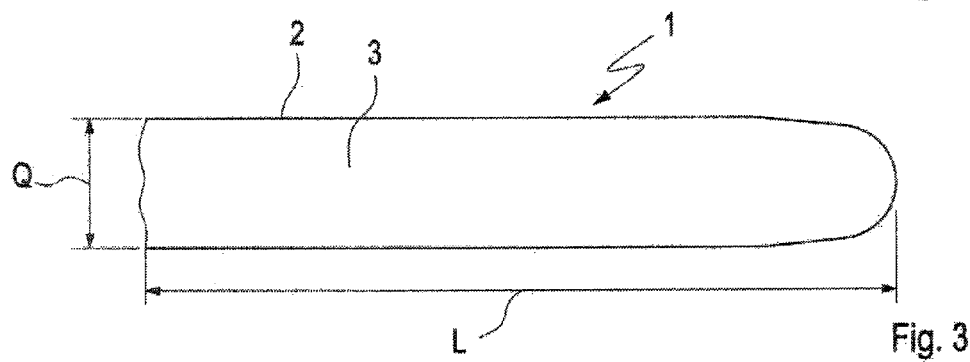
FIG. 3 shows the supporting structure according to FIG. 1 in the fully unfolded condition.

FIGS. 1 to 3 illustrate schematically, a side view of a supporting structure 1, which is rolled up in the deactivated state. Alternatively, a zigzag folding or other folding is possible. As can be seen especially from FIG. 3, the length L of the supporting structure in the active state substantially exceeds the dimensions of its cross section Q. It is thus not significant which form of cross section is shown by supporting structure 1.

When a gas generator assigned to the supporting structure 1 is activated, the abruptly generated gas G reaches the interior 3 of the supporting structure 1 formed by walls 2, unfolding the supporting structure in the direction of its longitudinal extension. As the gas G in the longitudinal supporting structure 1 can flow only from the back to the front, the portion 4 of the supporting structure which is still rolled up is displaced in the flow direction and unreels.

If an obstacle 5 is present in the unfolding path, the portion 4 which is not yet unfolded, is disconnected due to the low cross section, so that no further gas G can flow in (see FIG. 2a). The supporting structure 1 is markedly unstable in relation to interfering transverse forces in this state, so that the portion not yet unfolded is simply disconnected at the location designated as 6 when an obstacle is encountered. As a result, the supporting structure does not achieves the stability which it would have when fully unfolded and/or the final volume or the final extension, so that the load values on the occupants are reduced substantially.

Depending on the impact angle between the obstacle 5 and the supporting structure 1, an evasion of the supporting structure can take place instead of the complete disconnection. (FIG. 2b). The supporting structure also does not achieve the stability which it would have when fully unfolded.

If however the supporting structure 1 is completely filled with gas (see FIG. 3), the full stability, that is, the full restraining effect is achieved.

Figure 4:
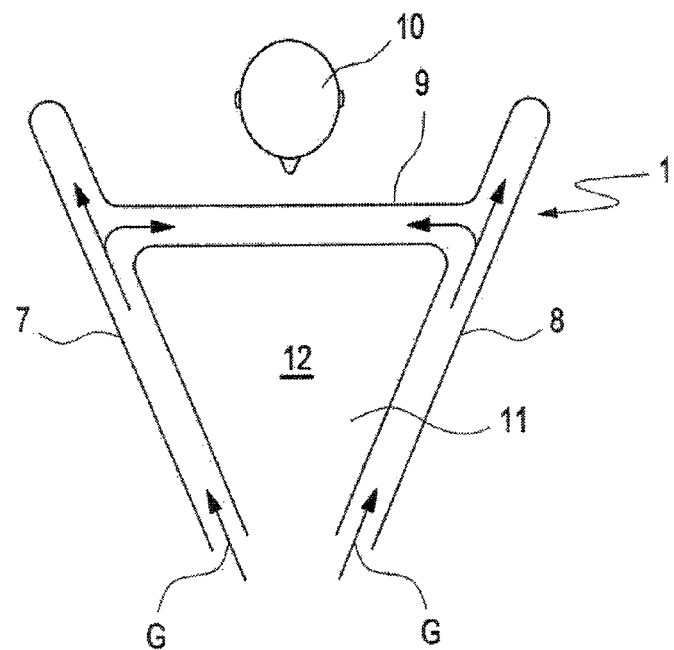
FIG. 4 shows a restraint system with a complex supporting structure.

FIG. 4 shows a restraint system which is formed with two supporting structures 7, 8 proceeding in the longitudinal direction of the vehicle and a supporting structure 9 proceeding in the transverse direction of the vehicle. The three supporting structures 7, 8, 9 are connected to one another in a fluidic manner, so that the supporting structures 7 and 8 unfolds first after activation along this longitudinal extension, and thereafter the supporting structure 9 unfolds in its longitudinal extension. The occupant 10, who is virtually enclosed by the supporting structures 7, 8, 9 can also be protected against lateral forces by the arrangement with an inclined impact.

Figure 6:
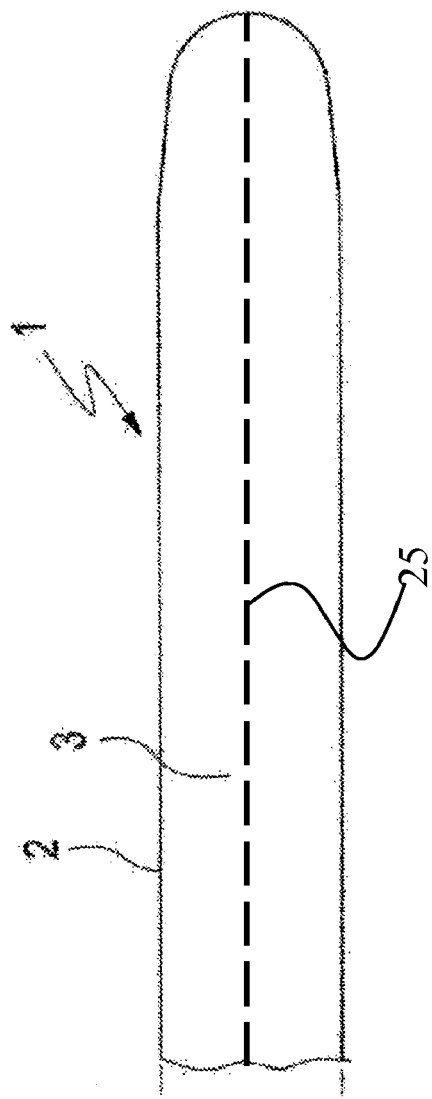
FIG. 6 is another illustration of the supporting structure according to FIG. 1 in the fully unfolded condition.
Figure 6:
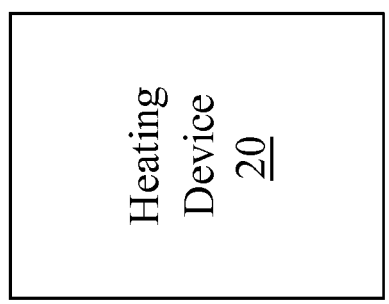
Figure 7B:
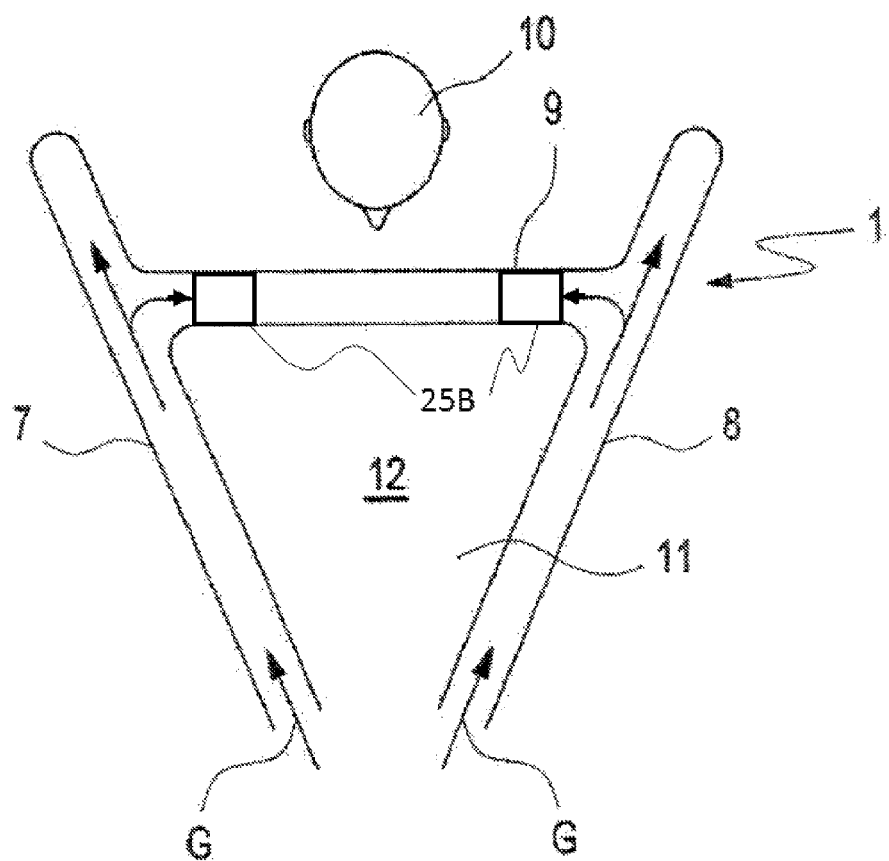

A flexible sheet 11 can be fixed between the supporting structures 7, 8, 9, so that an interior 12 is enclosed, for example with four supporting structures arranged in a funnel-shaped manner. As illustrated in FIG. 6, gas present in the interior 12 can be heated or supplemented by a heating device 20 (e.g., an ignition tablet or a small gas generator step which develops heat with possibly a very low gas volume), so that the gas expands and the system becomes harder. As also illustrated in FIG. 6, redistribution provided in the form of tear seams 25 that break down at a certain pressure, so that the supporting structure can increase in its transverse direction (i.e., in its cross-section). As further illustrated in FIGS. 7A and 7B, the redistribution means is a pressure-relief valve 25A, 25B, through which the excess gas escapes to the environment or to adjacent supporting structures.

Figure 5:
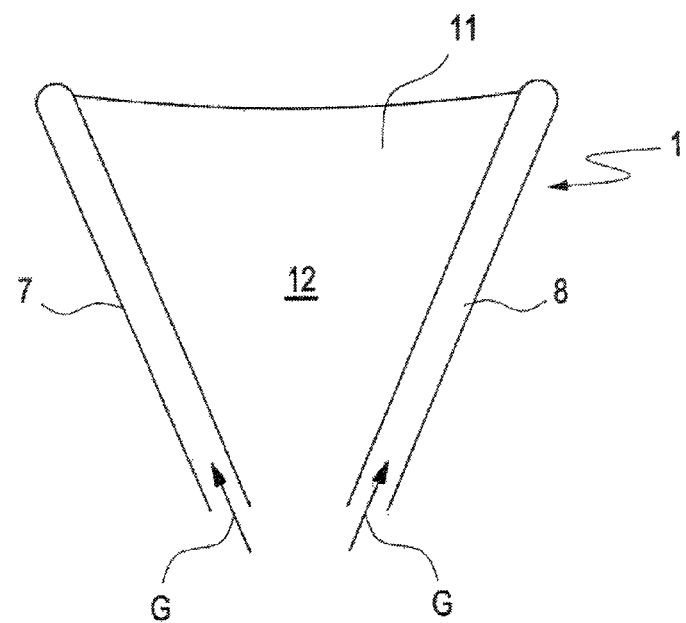
FIG. 5 shows two supporting structures connected to one another by a flexible sheet.

In FIG. 5, a second embodiment is shown, where the transverse supporting structure is missing. The arrangement of the supporting structures in cooperation with the flexible sheets depends significantly on the position of the restraint system within the vehicle and the expected load conditions. Thus, the supporting frame-like arrangement for a lateral impact protection will be designed in a different manner due to spatial reasons than supporting structures for the frontal impact. It is however a fact that a plurality of positions can be achieved in the vehicle with the longitudinal supporting structures, which conventional gas bags cannot achieve due to the necessary gas volume.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A restraint system for a motor vehicle comprising:
first, second, and third supporting structures, each of which has a longitudinal extension in a deployed state that substantially exceeds a transverse extension, and each of which unfolds mainly in a direction of the longitudinal extension,
wherein the first, second, and third supporting structures have substantially a same shape in the deployed state,
wherein the first and second supporting structures each have an inlet coupled to receive gas from an external source, and the third supporting structure is configured to receive the gas from the external source via the first and second supporting structures,
wherein at least one of the following is true:
when at least the first and second supporting structures impact upon an obstacle prior to being completely unfolded, the first and second supporting structures do not have a same stability as when the first and second supporting structures are completely unfolded; and
when at least the first and second supporting structures impact upon an obstacle prior to being completely unfolded, the first and second supporting structures do not reach a final volume or a final extension,
wherein in the deployed state the first and second supporting structures extend in a longitudinal direction of the motor vehicle and the third supporting structure extends in a transverse direction of the motor vehicle,
wherein the third supporting structure is configured along a length of the first and second supporting structures such that the first, second and third supporting structures form an A shape.

2. The restraint system according to claim 1, further comprising a heating device, which heats or supplements aspired or enclosed gas in the deployed state of the first, second, and third supporting structures.

3. The restraint system according to claim 1, wherein one of the first, second, and third supporting structures extends with an at least partial overlap of a hard structure of the motor vehicle.

4. The restraint system according to claim 1, wherein at least one of the first, second, and third supporting structures unfolds between first and second occupants as an interaction bag.

5. The restraint system according to claim 1, wherein the first, second, and third supporting structures are connected to one another by a flexible sheet.

6. The restraint system according to claim 5, wherein at least one of the first, second, and third supporting structures and the flexible sheet is produced as a one-piece-woven material.

7. The restraint system according to claim 1, wherein:
venting apertures are directed towards an occupant from an enclosed carrier volume; and
said venting apertures are arranged so that they are covered by the occupant who is displaced in a forward direction.

8. The restraint system according to claim 7, wherein the venting apertures are perforations or other passages, which are included in a material enclosing the carrier volume.

9. The restraint system according to claim 1, wherein the first, second, and third supporting structures are inflatable with the gas.

10. The restraint system according to claim 9, wherein said gas is pyrotechnically produced.

11. The restraint system according to claim 9, wherein a carrier volume supported by the first, second, and third supporting structures can be filled by aspiring or enclosing ambient air.

12. The restraint system according to claim 1, further comprising redistribution means for distributing excess gas.

13. The restraint system according to claim 12, wherein the redistribution means redirects the excess gas into an adjacent supporting structure.

14. The restraint system according to claim 12, wherein the redistribution means effects an increase of a cross section of one of the first, second, and third supporting structures when an interior pressure is too high.

15. The restraint system according to claim 12, wherein the redistribution means is a pressure-relief valve, through which the excess gas escapes to the environment or to adjacent supporting structures.

16. A vehicle restraint system comprising:
first, second, and third inflatable supporting structures, wherein
said first, second, and third supporting structures have substantially a same shape a in the deployed state;

said first and second supporting structures each have an inlet coupled to receive gas from an external source, and the third supporting structure is configured to receive the gas from the external source via the first and second supporting structures, said first, second, and third supporting structures each has a longitudinal dimension that substantially exceeds a transverse dimension;

said first, second, and third supporting structures are each deployable from an uninflated storage position to an inflated operational position;

in said uninflated storage position, said first, second, and third supporting structures are each rolled up or folded along the longitudinal dimension, so that during inflation, each of the first, second, and third supporting structures unrolls or unfolds longitudinally into a substantially tubular configuration; and when at least one of the first, second, and third supporting structures impacts an obstacle during inflation, further inflation and unrolling of said at least one of the first, second, and third supporting structures is precluded, wherein in the deployed state the first and second supporting structures extend in a longitudinal direction of the motor vehicle and the third supporting structure extends in a transverse direction of the motor vehicle, wherein the third supporting structure is configured along a length of the first and second supporting structures such that the first, second and third supporting structures form an A shape.

\* \* \* \* \*